United States Patent [19]

Minekawa et al.

[11] 3,887,535

[45] June 3, 1975

[54] PROCESS FOR PRODUCING RUBBERY CONJUGATED DIOLEFIN POLYMERS HAVING BRANCHED STRUCTURES

[75] Inventors: Saburo Minekawa; Sigeru Yonekawa; Haruro Tabata, all of Yokohama; Takashi Ishida, Kamakura; Satoshi Tsuchida, Yokohama; Kiyoshi Yamada, Kawasaki, all of Japan

[73] Assignee: Asahi Kasei Kogyo Kabushiki Kaisha, Osaka, Japan

[22] Filed: May 8, 1972

[21] Appl. No.: 251,110

Related U.S. Application Data

[63] Continuation of Ser. No. 12,657, Feb. 19, 1970, abandoned, and a continuation-in-part of Ser. No. 688,788, Dec. 7, 1967, abandoned.

[30] Foreign Application Priority Data

Dec. 16, 1966 Japan.............................. 41-82029

[52] U.S. Cl......... 260/94.2 M; 260/23 R; 260/83.7; 260/94.7 A
[51] Int. Cl............................ C08d 3/04; C08f 3/16
[58] Field of Search .............................. 260/94.2 M

[56] References Cited
UNITED STATES PATENTS 3,208,988  9/1965  Forman et al. .................... 260/94.2
3,410,838  11/1968  Strobel............................. 260/94.7
3,461,109  8/1969  Ainton et al.................. 260/94.2 X

OTHER PUBLICATIONS

Polymer Chemistry of Synthetic Elastomers; Part II, Vol. XXIII, Kennedy & Torquist, Interscience; Sept., 1969, Forman, 491–535.

Branching of Macromolecules of Different Synthetic Rubbers; Journal Polymer Science, Vol. 29, p. 617, "Poddubnye" et al.

Primary Examiner—Murray Tillman
Assistant Examiner—Richard B. Turer
Attorney, Agent, or Firm—Flynn & Frishauf

[57] ABSTRACT

A unique polymerization process for producing rubbery polymers having excellent physical properties and processability and freed from a cold flow property at normal temperature. The process, which might be called "Hightemperature instantaneous-continuous polymerization process," comprises bringing a mixture of conjugated diolefin having from 4 to 5 carbon atoms per molecule and a metallic lithium or an alkyl-lithium catalyst continuously into a reaction zone maintained at a temperature of from about 90° to 235°C. to give a polymer having a desired degree of branching from which the desirable properties mentioned above are derived.

5 Claims, 4 Drawing Figures

PROCESS FOR PRODUCING RUBBERY CONJUGATED DIOLEFIN POLYMERS HAVING BRANCHED STRUCTURES

CROSS-REFERENCE TO RELATED APPLICATION

This is a continuation of application Ser. No. 12,657, filed Feb. 19, 1970, now abandoned, and a continuation-in-part application to U.S. patent application Ser. No. 688,788 filed Dec. 7, 1967 and abandoned.

BACKGROUND OF THE INVENTION

1. Field of the Invention

This invention relates to a process for producing rubbery polymers having branched structures from which improved physical properties are brought about.

2. Description of the Prior Art

In recent years, the rubbery polymers obtained by using a metallic lithium or an alkyllithium catalyst are gaining more and more important position in the field of vulcanized rubber since they normally have quite excellent performances such as the abrasion resistance, low temperature characteristics, flex-cracking resistance, dynamic properties, etc.

However, these rubbery polymers obtained by using an organolithium catalyst are known heretofore to have practically perfect linear structures, lacking completely the branched structures in their molecules, as described in Industrial and Engineering Chemistry, Johnson, B.L., 40, 351 (1948), Journal of Polymer Science, Part C, No. 1, p. 311 (1963) and Part A, No. 2, p. 797 (1964). Thus, they have drawbacks in that their flow properties at room temperature or socalled "cold flow," are extremely high, and that the tensile strength and tear resistance of the unvulcanized rubber are poor due to the less entanglement among the molecules.

Because of these drawbacks as mentioned above, there have been often involved some difficulties in the processing operations of these rubbery polymers prior to the vulcanization thereof and, as a result, the use of these rubbery polymers known heretofore has been greatly restricted in spite of the excellent performances belonging to them.

Heretofore, in order to prevent the flow properties at room temperature, there have been proposed a number of methods which may be generally classified into the following three groups:

1. Methods of giving chemical cross-linking among the rubber molecules by the incorporation of a cross-linking agent having polyfunctional group, as disclosed in Dutch Pat. No. 6,602,265.

2. Methods of giving cross-linking among the rubber molecules by using a radical generating reagent as described in the specification of British Pat. No. 1,018,364.

3. Methods of preventing the cold flow by blending of a different type of polymer as disclosed in U.S. Pat. Nos. 3,244,773 and 3,240,841.

However, the methods for preventing the cold flow proposed heretofore based on these conceptions as generally classified into the above-mentioned three groups are inevitably accompanied by the deterioration in the performances of the rubbery polymers and, sometimes, an extreme degradation in the processability.

SUMMARY OF THE INVENTION

It is, accordingly, an object of this invention to provide a novel polymerization process which enables the production of rubbery polymers having improved performances and processability and freed from the cold flow, overcoming the problems mentioned above involved in the methods for preventing the cold flow known heretofore.

The object of this invention mentioned above can now be accomplished by the process of this invention which comprises bringing a mixture consisting of a metallic lithium or an alkyllithium catalyst, monomeric conjugated diolefin having from 4 to 5 carbon atoms per molecule and a hydrocarbon diluent continuously into a reaction zone maintained at a temperature of about 90°–235°C. to polymerize the conjugated diolefin having from 4 to 5 carbon atoms per molecule while maintaining the reaction temperature within said specific range, i.e. from about 90° to about 235°C. thereby giving a rubbery polymer having a desired degree of branching.

The process of this invention is essentially different from those prior art methods adopted heretofore for the prevention of the cold flow. In accordance with this invention, there is obtained a rubbery polymer having an optionally controlled degree of branching in the molecule which, in turn, affords the polymer remarkable improvements in the tensile strength and the tear resistance under an unvulcanized condition, and in the processability while being completely prevented from the cold flow.

Now, the fundamental principle of the polymerization process of this invention will be explained hereinafter.

We have conducted a thorough study of the polymerization reaction of conjugated dienes by using a metallic lithium or an alkyllithium catalyst which has been believed heretofore to produce only linear high molecular polymers. As a result, we have found that the metallic lithium or alkyllithium catalyst activates methylene and unsaturated groups in the polymer chain under a certain condition which will be described in detail hereafter, and the polymerization reaction of conjugated diolefin having from 4 to 5 carbon atoms per molecule may also be initiated from the active centers.

That is, in the polymerization of conjugated diolefin having from 4 to 5 carbon atoms per molecule by a metallic lithium or an alkyllithium catalyst under the conditions hitherto employed in laboratory or on a commercial scale, the propagation velocity at which the polymer is grown from the active center is far greater as compared with the initiation velocity at which the polymerization active center is formed by the catalyst. Thus, the activated monomer is readily grown to a linear polymer and, consequently, only a linear high molecular polymer has been obtained.

Whereas, under the reaction conditions according to the process of this invention, the initiation velocity of the polymerization active center is substantially equal to, or lower than the propagation velocity of the polymer. Thus, there may occur the formation of branching on the activated methylene or unsaturated groups to produce a branched polymer.

In accordance with the fundamental principle explained above which has been discovered by us for the first time, there exist several conditions under which those branched side-chains may be formed practically and efficiently.

For example, we have found that a polymer having a very high degree of polymerization can be obtained by further addition of new catalyst at an elevated temperature to the polymer solution of conjugated diene obtained by the conventional polymerization of the diene using a lithium based catalyst. The reason for the formation of the polymer of such high degree of polymerization is presumed that the newly added lithium catalyst is coordinated with methylene or unsaturated groups in the polymeric chain since there is no monomers to react in the reaction mixture, and other active polymeric chains are mutually coordinated with the active centers in spite of the high viscosity of the reaction mixture which impedes the molecular movement.

The reaction explained above is a reaction in the absence of monomer to react, i.e. a reaction between polymers in which the polymerization propagation velocity is zero, and it is a process for linking a polymer with other polymer after the polymerization has once been completed. The reaction falls within a purview of a reaction which is generally termed as "a jump reaction," but, the principle is an extreme case of the fundamental principle of this invention explained above.

The above description is given for the clear understanding of the polymer reaction. In actual case, although the molecular weight may be increased by the abovementioned polymer reaction, utilization of all of the active centers for the reaction may not be accomplished because of restricted movements of the polymer chains in the concentrated polymer solution and steric hindrance effects.

Thus, the reaction exemplified above is quite unsatisfactory in that the efficiency in the utilization of active centers is quite poor and that it is impossible to control at a disposal the length of side-chain on the polymeric chain because of the coordination of the polymerized high polymers on the activated centers in the other polymeric chains.

As a result of our further study of the reaction, we have found that in accordance with the process of this invention, the desired length and degree of branchings may be formed on the polymeric chain in the course of the polymerization reaction.

The process of this invention, which may be called as "High-temperature instantaneous-continuous polymerization process," comprises subjecting a monomer and an alkyllithium catalyst together with a hydrocarbon solvent directly to a polymerization condition continuously including a high temperature of from about 90° to 235°C., and proceeding the polymerization reaction instantaneously while maintaining the reaction temperature at a level within the range specified above.

In the process of this invention, it should be noted that an essential factor which enables the optional controlling of the degree of branching is not the application of a far higher reaction temperature than that used in the conventional polymerization known heretofore. In other words, a high molecular polymer having multiplicity of branches may not be produced by starting the polymerization reaction at a relatively lower temperature conventionally used heretofore and thereafter raising the temperature to a high level as specified in the process of this invention to carry out the polymerication at that temperature continously.

Thus, it is an essential factor for the optional control of the degree of branching to bring continuously a mixture of a monomer and a catalyst into a stationary state under a predetermined high temperature condition, i.e. from about 90° to about 235°C.

By comparison of a polymer obtained under the polymerization conditions of this invention with those obtained by the conventional polymerization process known heretofore, it has been found that the macrostructure in the molecules, particularly the degree of branching, is characteristically different from each other.

The essential mechanism of the process of this invention may be explained in detail as follows:

When the polymerization of conjugated diolefin having from 4 to 5 carbon atoms per molecule in the presence of an alkyllithium catalyst is analyzed from the standpoint of chemical kinetics, an attention must be given to the rate constants of the two elementary reactions. That is, one is the rate constant of polymerization initiation $k_I$ which is determined by the reaction rate between the monomer and the catalyst, the other is the rate constant of polymerization propagation $k_p$ which is determined by the growth rate of the polymer at which the monomer is further added to the growing active polymer.

The rate constant of polymerization propagation $k_p$ is invariably sufficiently larger as compared with the rate constant of polymerization initiation $k_I$ at a polymerization temperatures known and employed heretofore. As a practical example, an explanation will be given by making reference to the accompanying drawing which illustrates the relationship between the polymerization temperature and the constant $k_I$ in terms of a consumption rate of a catalyst as well as the constant $k_p$ in terms of a consumption rate of a monomer, these rate constants $k_I$ and $k_p$ being determined at the corresponding temperatures in the polymerization of 1,3-butadiene in the presence of a n-butyllithium.

Figure 1:
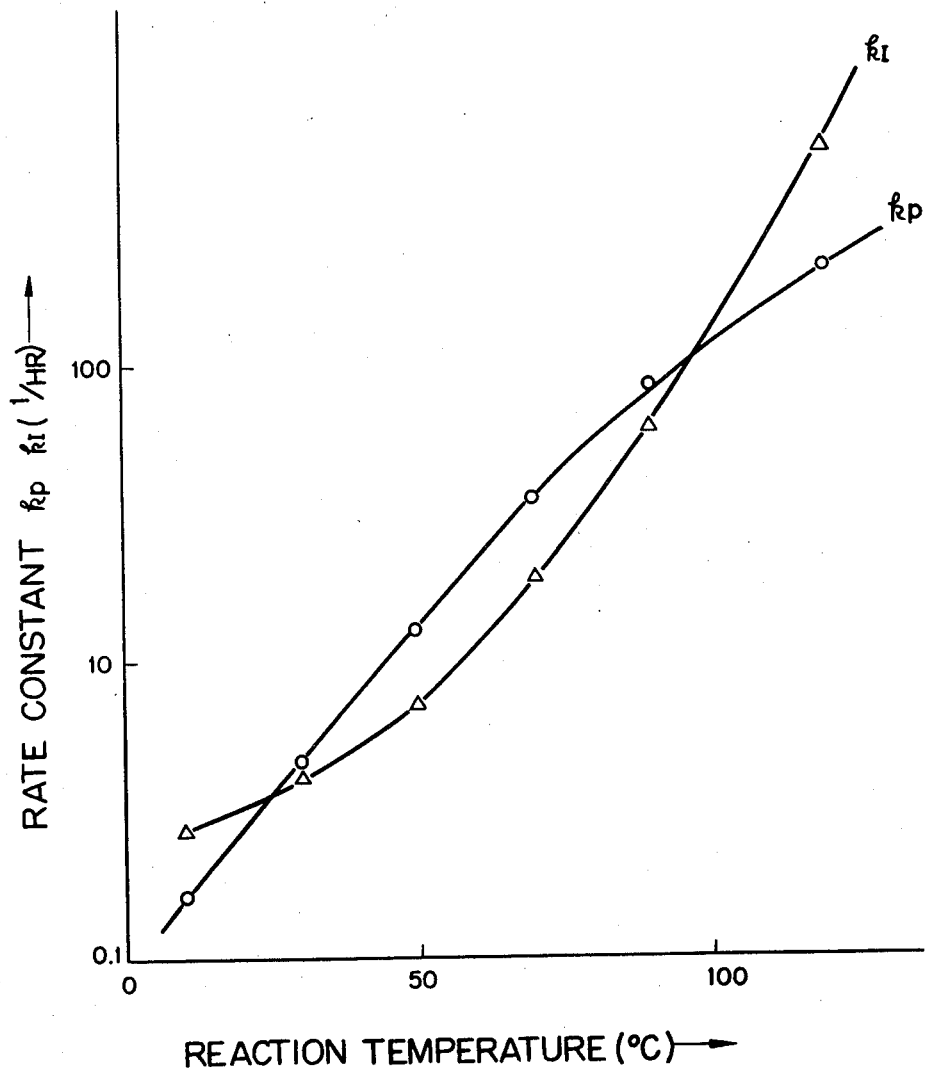
FIG. 1 shows the relationship between the reaction temperature and the rate constants $k_I$ and $k_p$ in the polymerization of 1,3-butadiene.

As can be noted from FIG. 1, in the polymerization temperature range of from 40° to 80°C. employed heretofore, the rate constant $k_p$ always takes a larger value than the rate constant $k_I$.

This means that under the polymerization temperature condition employed heretofore, the rate determining step of the reaction is the course of initiation of the polymerization and the active polymer which is once initiated continues to propagate very quickly. Thus, the polymer obtained under such conditions obviously has a long straight chain structure having less degree of branching.

On the other hand, under a high temperature reaction conditions ranging from about 90° to about 235°C. adopted in the process of this invention, the rate constant $k_I$ takes a value close to, or, larger than the rate constant $k_p$. That is, the dissociation of the catalyst occurs completely under such high temperature reaction condition, thus, the polymerization initiation reaction is accelerated and rate determining step has been moved over to the polymerization propagation reaction.

It has been observed that, under such high temperature condition, the polymerization initiation reaction is started and simultaneously the methylene or unsaturated groups of the coexisting active polymer are activated and that to the activated methylene or unsaturated groups of the active polymer are coordinated the alkyllithium catalyst or the active centers of other active polymer to induce an addition reaction, and consequently, several fresh active centers are created in the resulting molecule, and to these freshly created active centers are linked coexisting monomers as a result of the successive addition polymerization to propagate branches within the molecule.

From the above observation, it is considered that the mechanism of the instantaneous continuous polymerization of this invention is that the methylene or unsaturated groups and the alkyllithium catalyst which are activated at a high temperature are coordinated with each other to form polymers having active centers, and thereafter monomers are added or grafted to the active centers, and/or a coordination reaction of other active polymers to the active centers, i.e. a kind of an interpolymer reaction between low molecular weight polymers occurs. The production of rubbery polymers having branched structures has now been made possible by the reaction mentioned above.

In the process of this invention, the degree of branching can be controlled optionally by selecting the desired polymerization temperature within the specific temperature range of this invention, i.e. from about 90° to about 235°C. In order to determine the degree of branching, it is suitable to measure the William's Recovery of the polymers.

As can be understood from the reaction mechanism explained above, it has been found that as the temperature of the polymerization system to which the monomer and the catalyst are charged is raised, the degree of branching of the resulting polymer is increased, and a a result, the William's recovery is correspondingly increased and the flow property at normal temperature is improved remarkably.

Figure 2:
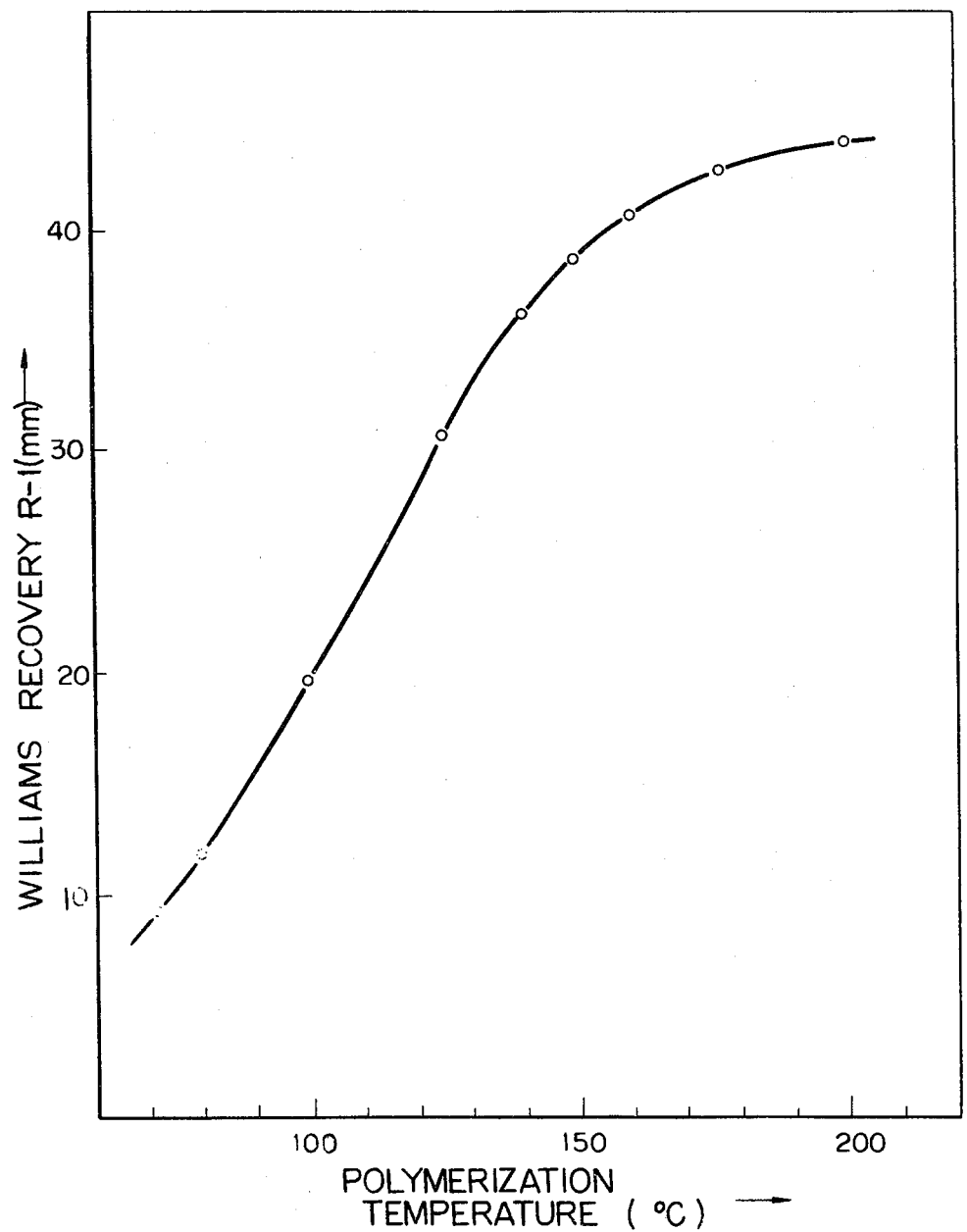
FIG. 2 shows the relationship between the polymerization temperature and William's Recovery of the product in the instantaneous continuous polymerization process at high temperature of this invention.

FIG. 2 shows the relationship between the polymerization temperature in the process of this invention and the values of the William's recovery of the rubbery polymers obtained at the corresponding temperature. The curve is a diagram showing the William's recovery of polybutadiene rubbery polymers obtained at different temperatures by using n-butyllithium catalyst. FIG. 2 clearly shows that the degree of branching can be optionally controlled by selecting the desired polymerization temperature within the specific temperature range of this invention, i.e. from about 90° to about 235°C.

In the process of this invention, the polymerization initiation temperature is limited to the range of 90°–235°C. because of the fact that the inducement of the branching reaction is extremely difficult at temperatures below 90°C., and in a high temperature region of above 235°C., the branching reaction is proceeded excessively to give gellike polymers which are less valuable as the rubbery polymers in the practical applications.

Alkyllithium catalysts which may be used in the process of this invention preferably include methyllithium, ethyllithium, propyllithium, n-butyllithium, amyllithium, hexyllithium, 2-ethylhexyllithium.

The amount of the catalyst required depends upon the type of the polymer contemplated. However, in general, the amount is practically the same as that of the catalyst required in the reaction at the temperatures employed heretofore.

Conjugated diolefins having from 4 to 5 carbon atoms per molecule which may be used in the process of this invention include 1,3-butadiene, 2-methyl-1,3-butadiene (isoprene) and 1,3-pentadiene (piperylene).

Diluents which may be used in the process of this invention are paraffinic, cycloparaffinic and aromatic hydrocarbons, and the typical examples of these diluents include pentane, hexane, isobutane, isooctane, n-dodecane, cyclopentane, cyclohexane, methylcyclohexane, benzene, toluene, xylene, ethylbenzene and the like. These diluents exemplified above may be used either alone or in admixture of two or more kinds.

While the amounts of these solvents used and the feed temperature are decided upon as means for controlling the polymerization temperature which normally ranges from 90° to 235°C., depending upon the desired degree of branching in the polymer contemplated, in general, the solvent-to-monomer ratio of from 2:1 to 6:1, and a feed temperature of from 5° to 120°C. are employed.

The rubbery polymer of the present invention obtained by the polymerization in the presence of an alkyllithium catalyst in the hydrocarbon diluent is mixed with an antioxidant such as phenyl-$\beta$-naphthylamine, then separated from the diluent, and dried to yield the desired product according to the conventional method.

In the polymerization reaction of this invention, the polymer completely free from gel may be produced continously in a conversion of nearly 100 percent based on the conjugated diene charged.

Now, there will be explained hereinafter the remarkable effect of this invention that the rubbery polymers having optionally controlled branched structures according to this invention possess an excellent processability and exhibit no flow property at room temperature, i.e. cold flow.

Figure 3:
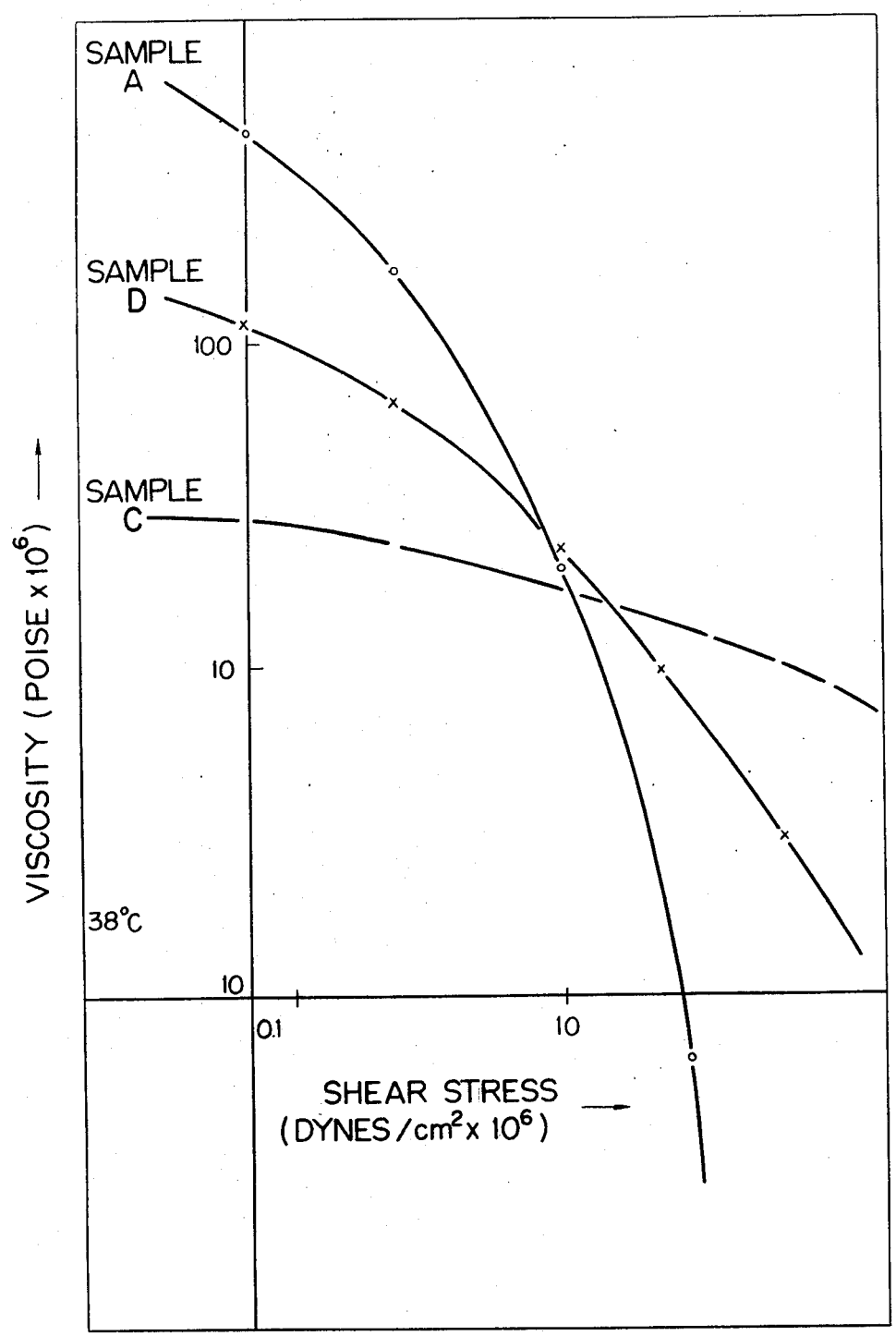
FIG. 3 illustrates the relationship between the shear stress and the viscosity of polybutadiene.

FIG. 3 shows the curves obtained by plotting the viscosity values at the different shear stress of three samples, i.e. polybutadiene sample (A) obtained according to the process of this invention, polybutadiene comparative sample (C) having the same composition as that of the sample (A) but obtained according to the conventional process, wherein the cold flow is not improved, and polybutadiene comparative sample (C) of which cold flow is prevented according to the conventional process, i.e. by using divinylbenzene.

The preparation of these samples will be explained in detail in Example 1 hereinafter. Generally speaking, in order that a rubbery polymer has a sufficiently high resistance to the cold flow and exhibits an excellent processability, the polymer is required to have sufficiently great resistance to prevent the flow at lower shear stress, i.e. external force, but sufficiently high flow property to give an excellent processability at a greater shear stress. Namely, it is required to show a non-Newtonian physical properties in which the resistance is variable depending upon the extent of the stress exerted.

As can be noted from FIG. 3, it is clear that the comparative sample (C) of which cold flow is improved by the chemical cross-linking has a large viscosity value at a low shear stress and the viscosity value is firmly retained even when the shear stress exerted on the sample is increased. This, clearly, is the cause of degradation in the processability of the rubbery polymer of which cold flow is prevented by the chemical cross-linking. Similar tendency can be clearly observed with regard to a group of samples of which cold flows were prevented by the radical corss-linking.

In the polybutadiene comparative sample (C) having relatively straight-chain structure which is prepared according to the conventional polymerization process known heretofore without giving any particular consideration to the prevention of cold flow, it is shown that the viscosity value is sufficiently low to cause the flowing of polymer at a small shear stress, and the viscosity value remains unchanged at a greater shear stress, i.e. the processability is not improved.

On the other hand, the polybutadiene sample (A) which is polymerized according to the process of this invention shows a larger viscosity value than that of the comparative sample (D) at a small shear stress, indicating that the cold flow can be prevented perfectly, while its viscosity value can be decreased even lower than that of the comparative sample (C) at a greater shear stress, indicating clearly that it has an excellent processability.

It is crystal clear that the feature of the rheological properties of the sample (A) has its basis on the macrostructure of the high molecular polymer, particularly the branched structure characteristic of the polymer. That is, the rubbery polymer obtained according to the process of this invention shows the non-Newtonian rheological properties as illustrated in FIG. 3 because of the fact that it has the branched structure which may be accurately controlled by the polymerization conditions.

The method of producing the branched structures on a polymeric chain according to the process of this invention is entirely novel and essentially different from the methods known heretofore involving, for example, the chemical cross-linking, radical cross-linking, blending of different type of polymers or the addition reaction. Therefore, in accordance with this invention, there are brought about a number of advantages over these prior art process from the commercial viewpoint as enumerated in following:

1. Since no chemical cross-linking agent or radical cross-linking agent is used, a continuous operation for a prolonged period of time is possible without accompanying a gelation in the manufacturing process.

2. The cold flow can be perfectly prevented even in an oil extended rubbery polymers.

Figure 4:
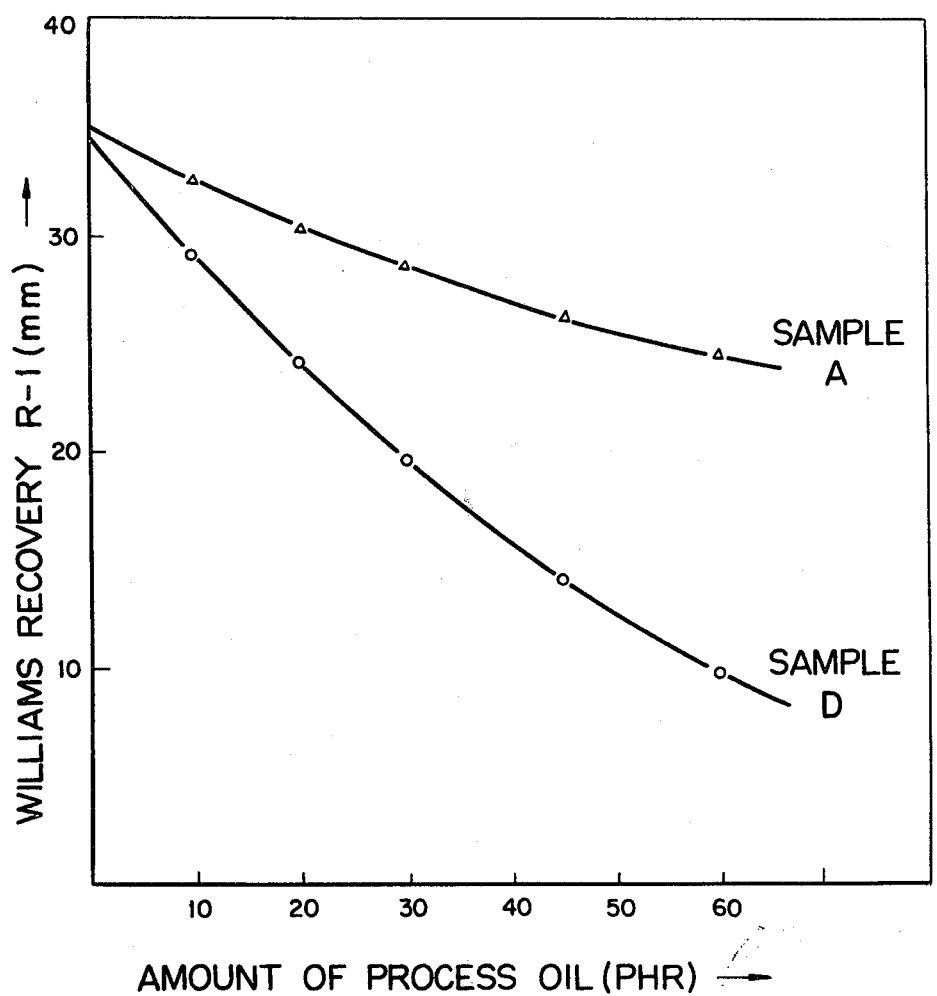
FIG. 4 shows the relationship between the amount of process oil added and William's Recovery, when the process oil is added to polybutadiene.

More particularly, FIG. 4 shows the comparison of the Williams recovery of the rubbery polymer of which cold flow was prevented by the conventional chemical cross-linking, i.e. of the comparative sample (D) in FIG. 3 extended with a process oil, with that of the rubbery polymer of which cold flow was improved according to the process of this invention, i.e. of the sample (A) in FIG. 3 extended with a process oil.

As stated above, values of the William's recovery indicate the degree of branching in polymer molecule, i.e. the resistance to cold flow. FIG. 4 clearly indicates that the prevention of cold flow accompanied by the branched structure according to the process of this invention may be effectively retained even in the polymer extended with a process oil as compared with that of the polymer obtained and extended by the conventional processes known heretofore.

3. One of the particularly unique properties of the present rubbery polymer is an excellent roll mill processability, and, as a result, there are brought about remarkable effects such as the lowering in the temperature of tight banding to roll mill, improvement in the compatibility with fillers and vulcanizing agents and the resulting shortened mixing time.

4. Because of the excellent compatibility, the resulting compounds have superior performance. Particularly, they are excellent in the abrasion resistance and the flex-cracking resistance.

Although these are the major effects of the rubbery polymers obtained according to the process of this invention, there are other appendant effects such as the simplified storing and packing equipments, and the easy handling and transportation, which are by no means of least importance.

DESCRIPTION OF THE PREFERRED EMBODIMENTS

The following Examples will serve to illustrate this invention more fully and practically.

It should not be construed, however, that these Examples restrict this invention as they are given merely by way of illustration.

EXAMPLE 1

To an autoclave provided with a heater which was charged with n-hexane and preheated at 120°C. beforehand were continuously charged a solution, which was preheated at 50°C. and containing 25 parts by weight of 1,3-butadiene and 75 parts by weight of n-hexane up to 80 percent level of the autoclave, and a 5 percent n-hexane solution at room temperature containing 0.0125 part by weight of n-butyllithium as a catalyst. 1,3-Butadiene charged reacted immediately and the temperature of the autoclave was raised up to 151°C.

After a lapse of 10 minutes, to the reaction mixture was added 0.25 part by weight of 2,6-di-tert-butyl-p-cresol per 100 parts by weight of the polymer and the polymerization reaction was terminated. The conversion of 1,3-butadiene was 99.76 percent. The polymer solution was dried by a heated drum dryer to give a sample (A).

To a reactor was supplied continuously a mixture containing 100 parts by weight of 1,3-butadiene, 300 parts by weight of n-hexane at 50°C. and a 5 percent n-hexane solution containing 0.0050 part by weight of n-butyllithium at room temperature as a catalyst and the polymerization reaction was carried out continuously at 150°C. for about an hour.

After 0.25 part by weight of 2,6-di-tert-butyl-p-cresol per 100 parts by weight of polybutadiene was added to the reaction mixture at the outlet of the reactor, the polymer solution was dried by a dryer to give a sample (B). The conversion of 1,3-butadiene was 99.8 percent.

For comparison, to a reactor train was supplied continuously a mixture containing 100 parts by weight of 1,3-butadiene, 300 parts by weight of n-hexane and 0.0050 part by weight of n-butyllithium and the polymerization reaction was carried out continuously first at 40°C. for 2.2 hours, second at 45°C. for 2.2 hours, third at 50°C. for 2.2 hours, fourth at 60°C. for 2.2 hours and last at 70°C. for 2.2 hours. After 0.25 part by weight of 2,6-ditert-butyl-p-cresol per 100 parts by weight of polybutadiene was added to the reaction mixture at the outlet of the equipment, the polymer solution was supplied to a dryer to give a comparative sample (C). The conversion of 1,3-butadiene was 99.80 percent.

For further comparison, a comparative sample (D) was prepared by using the same equipment and the same composition of the mixture as in the preparation of the comparative sample (C) except that 0.25 part by weight of divinylbenzene per 100 parts by weight of 1,3-butadiene was added. The conversions of 1,3-butadiene and divinylbenzene were 99.75 and 95.6 percent, respectively.

The following Table 1 shows the Mooney viscosity, the flow property and the mill processability of the samples (A), (B), (C) and (D):

Table 1

| Item | Samples | (A) | (B) | (C) | (D) |
|---|---|---|---|---|---|
| (1) | $ML_{1+4}(100°C)$ | 35.0 | 36.5 | 34.0 | 35.5 |
| (2) | Y-3 (mm) | 4.65 | 4.80 | 1.50 | 3.45 |
| (3) | R-1 (mm) | 3.85 | 3.95 | 0.18 | 2.25 |
| (4) | Flow test (mg/min) | 0.3 | 0.3 | 7.5 | 0.4 |
| (5) | Flowing rate (mm/min) | | | | |
| | 25°C. | 0.08 | 0.05 | 0.52 | 0.09 |
| | 60°C. | 0.11 | 0.09 | 1.20 | 0.13 |
| (6) | Minimum temperature of tight banding to roll mill (°C) | 52 | 52 | 80 | 106 |

In the above Table:
(1) By JIS-K-6300.
(2) Williams Plasticity (ASTM D-926)
(3) Williams Recovery (ASTM D-926)
(4) Extruding rate from an orifice of 0.6 cm² at 100°C. under a pressure of 250 g/cm².
(5) Rate of deformation of a sample of cylindrical shape having 2 cm. diameter and 3 cm. height, placed on an inclined plane at 45° in a thermostat maintained at a predetermined temperature.
(6) Minimum surface temperature required for the sample to band to roll mills smoothly by using 8" diameter roll mills under operating conditions including a revolving ratio of 1:1.4 and a roll clearance of 5.0 mm.

As can be clearly noted from the Table 1, the samples (A) and (B) are far superior in all flow tests to the comparative sample (C), in spite of the fact that they have the same Mooney viscosities. Although the comparative sample (D) shows satisfactory performances comparable to those of the samples (A) and (B) in the flow tests, it is even worse than the comparative sample (C) in the mill processability, showing the samples (A) and (B) to be quite excellent in this regard.

The samples (A), (B), (C) and (D) were respectively compounded according to a recipe shown in Table 2. The compatibility, the flow properties, extrusion property, and the green strength of the unvulcanized compounds thus obtained are given in the following Table 3:

Table 2

| Recipe | Parts by weight |
|---|---|
| Polybutadiene sample | 100 |
| HAF carbon black | 50 |
| Aromatic process oil | 10 |
| Stearic acid | 1 |
| Zinc oxide | 3 |
| Antioxidant D* | 1 |
| Vulcanization accelerator CZ** | 1 |
| Sulfur | 1.8 |

*Trade name, phenyl-β-naphthylamine.
**Trade name, N-cyclohexylbenzothiazyl sulfonamide.

Table 3

| Item | Samples | (A) | (B) | (C) | (D) |
|---|---|---|---|---|---|
| (1) | Mixing time required (min) | 25 | 24 | 40 | 62 |
| (2) | Flow rate test (mm/min), 70°C. | 0.07 | 0.07 | 1.25 | 0.14 |
| (3) | Extrusion Characteristics | | | | |
| | (A) Rate of extrusion (cc/min) | 8.6 | 8.4 | 7.4 | 6.3 |
| | (B) Die swelling | 36 | 35 | 32 | 50 |
| | (C) Evaluation of extrudate appearance | 4 | 4 | 2 | 1 |
| (4) | Green strength of compound (kg/cm²) | 3.8 | 3.9 | 1.9 | 2.2 |

(1) An open roll was used and the operating temperature was 80°C.
(2) Same as (5) in Table 1.
(3) Brabender-type extruder of the following specification was used:
Screw dimension : 15 mmφ × 90 mm.
Screw rotation : 20 r.p.m.
Extruding orfice size : 2.0 mm.
The extruding temperature was 90°C. The extrudate appearance was evaluated by giving 4 points to a satisfactory surface.
(4) Values shown were obtained by applying the measuring method according to JIS-K-6301 to the unvulcanized samples.

As can be noted from Table 3, the samples (A) and (B) obtained according to the process of this invention require very short mixing period, and moreover, the flow property, extrusion property, particularly the evaluation of the extrudate appearance, as well as the green strength are far superior to those of the comparative samples (C) and (D).

The following Table 4 shows the physical properties of these four different samples as measured after vulcanizing them at 140°C. for 30 minutes:

Table 4

| Item | Sample | (A) | (B) | (C) | (D) |
|---|---|---|---|---|---|
| Tensile strength (kg/cm²)* | | 145 | 146 | 130 | 133 |
| 300% tensile modulus (kg/cm²)* | | 70 | 70 | 66 | 72 |
| Ultimate elongation (%)* | | 462 | 455 | 490 | 420 |
| Tear strength (kg/cm)* | | 40 | 41 | 35 | 35 |
| Hardness (Hs JIS)* | | 64 | 64 | 62 | 64 |
| Resilience by RÜPKE resilience tester (%) | | 62 | 62 | 60 | 61 |
| Akron abrasion (cc/1000 times)** | | 0.03 | 0.03 | 0.06 | 0.08 |

Table 4 – Continued

| Item Sample | (A) | (B) | (C) | (D) |
|---|---|---|---|---|
| Flex-cracking by Demattia tester (times)** | | 2650 | 2650 | 2010 | 2250 |

*Measured according to JIS-6301.
**Revolution 250 r.p.m., Slipping angle 15°, Load 4.5 kg.
***Measured according to ASTM-D-S13-59 (crack growth).

From the results shown in Table 4, it is clearly noted that the samples (A) and (B) obtained according to the process of this invention have excellent physical properties including the fundamental properties such as the tensile strength and the tear strength.

EXAMPLE 2

The samples (A-1), (A-2), (A-3) and (A-4) were prepared according to the same procedures as in the preparation of the sample (A) in Example 1 except that the polymerization temperatures were controlled at 100°C., 125°C., 150°C. and 175°C., respectively. Consequently, the sample (A-3) in the instant Example is the same as the sample (A) in Example 1.

The Mooney viscosity and the flow property of these four samples are shown in the following Table 5:

Table 5

| Item Samples | (A-1) | (A-2) | (A-3) | (A-4) |
|---|---|---|---|---|
| Polymerization temperature (°C) | 101 | 125 | 151 | 176 |
| $ML_{1+4}$ (100°C) | 33.0 | 34.5 | 35.0 | 35.5 |
| Y-3 (mm) | 3.05 | 3.95 | 4.65 | 5.00 |
| R-1 (mm) | 1.95 | 3.05 | 3.85 | 4.28 |
| Flow test (mg/min) | 0.72 | 0.45 | 0.30 | 0.25 |
| Flow rate (mm/min), 25°C. | 0.12 | 0.09 | 0.08 | 0.04 |
| 60°C. | 0.18 | 0.18 | 0.10 | 0.06 |

These measurings were performed according to the same methods as those explained in Table 1 under (1)-(5).

It can be clearly noted from Table 5 that polymers having optionally controlled degree of branching, i.e. the optional flow property can be produced by selecting the desired polymerization temperature.

EXAMPLE 3

To an autoclave provided with a heater which was charged with n-hexane and preheated at 160°C. beforehand, was continuously charged a solution which was preheated at 80°C. and containing 25 parts by weight of 1,3-butadiene and 75 parts by weight of n-hexane up to 80 percent level of the autoclave, together with 0.0055 part by weight of n-butyllithium at room temperature.

1,3-Butadiene thus charged was polymerized instantaneously and the temperature of the autoclave was raised to 200°C. After a lapse of 15 minutes, to the reaction mixture was added 0.50 part by weight of 2,6-di-tert-butyl-p-cresol per 100 parts by weight of the polymer and the polymerization reaction was terminated. To the resulting polymer was then added 50 parts by weight of an aromatic process oil having a specific gravity of 1,0035 and a viscosity gravity constant of 0.9330 per 100 parts by weight of the polymer and after a sufficient mixing, the mixture was dried by using a heating drum dryer to give an oil extended polymer as a sample (E).

For comparison, to a polymerization equipment was supplied continuously a solution containing 25 parts by weight of 1,3-butadiene, 75 parts by weight of n-hexane, 0.0055 part by weight of n-butyllithium and 0.2 part by weight of divinylbenzene, and the polymerization reaction was conducted continuously first at 40°C. for 2.2 hours, second at 45°C. for 2.2 hours, third at 60°C. for 4.4 hours and last at 70°C. for 2.2 hours. Then the reaction mixture were mixed with 0.5 part by weight of 2,6-di-tert-butyl-p-cresol and 50 parts by weight of an aromatic process oil per 100 parts by weight of polybutadiene at the outlet of the equipment.

After a thorough mixing by agitation, the reaction mixture was fed to a drum dryer and dried to give an oil extended polymer as a sample (F).

The physical properties of these samples thus obtained as measured before and after the extending with process oil are shown in the following Table 6:

Table 6

| | Item Sample | (E) | (F) |
|---|---|---|---|
| Before extending with process oil | $ML_{1+4}$ (100°C) | 95.0 | 93.0 |
| | R-1 (mm) | 4.8 | 4.1 |
| | Y-3 (mm) | 4.6 | 4.8 |
| | Gel content (%)* | — | 5.3 |
| After extending with process oil | $ML_{1+4}$ (100°C) | 35.0 | 30.5 |
| | R-1 (mm) | 3.6 | 1.6 |
| | Y-3 (mm) | 3.8 | 3.0 |
| | Flow test (mg/min) | 0.7 | 1.6 |

*% by weight of residue obtained by dissolving the samples in toluene and filtering the resulting solution through a 200 mesh sieve.
Other tests and measurings were performed according to the methods explained in Table 1.

It can be noted from the Table 6 that the sample (E) is superior to the sample (F) in that the gel content is completely zero and that the characteristic of the cold flow prevention is not degraded by the oil extending operation.

The oil extended samples (E) and (F) were then compounded according to the following recipe shown in Table 7 by using a Bunbury mixer and their compatibilities were measured.

The following Table 8 shows the physical properties of the unvulcanized compounded samples, including the green strength and the processability, particularly the extrudability.

Table 7

| Recipe | Parts by weight |
|---|---|
| Polybutadiene | 100 |
| HAF carbon black | 60 |
| Zinc oxide | 5.0 |
| Stearic acid | 2.0 |
| Antioxidant C* | 1.0 |
| Antioxidant D | 1.0 |
| Vulcanization accelerator CZ | 1.0 |
| Sulfur | 1.6 |

*Trade name Aldol (α-naphthylamine)

Table 8

| Item | Sample | (E) | (F) |
|---|---|---|---|
| Mixing time in Bunbury mixer (min.) | | 7.2 | 9.5 |
| Mooney viscosity $ML_{1+4}$ (100°C) | | 56 | 61 |
| Green strength ($kg/cm^2$)* | | 4.8 | 3.5 |
| Extrusion properties** | Extrusion pressure ($kg/cm^2$) | 110 | 120 |
| | Extrudability (g/min.) | 1.38 | 1.20 |
| | Evaluation of extrusion*** | 8 | 6 |

*Valves obtained by applying the measuring method according to JIS-K-6301 to the unvulcanized samples.
**Extrusion tests were performed by using a Garvey Die Tester.
***Evaluated by giving 12 points to a satisfactory extrusion.

The Table 8 clearly indicates that the sample (E) has a better mixing property in a Bunbury mixer, a smaller compounded Mooney viscosity $Ml_{1+4}$ (100°C), a greater green strength, and a better extrudability as compared with the comparative sample (F). Particularly, the greater green strength affords a remarkable improvement in the processability in the manufacturer of tyre treads.

These two unvulcanized samples were then vulcanized at 140°C. for 50 minutes, respectively, and the physical properties of the resulting vulcanized samples were measured. The results are shown in the following Table 9:

Table 9

| Item | Sample | (E) | (F) |
|---|---|---|---|
| Tensile strength ($kg/cm^2$) | | 160 | 118 |
| 300% tensile modulus ($kg/cm^2$) | | 86 | 82 |
| Elongation (%) | | 450 | 412 |
| Tear resistance (kg/cm) | | 43 | 37 |
| Hardness (Hs JIS) | | 58 | 54 |
| Resilience by RUPKE resilience tester (%) | | 57 | 53 |
| Akron abrasion (cc/1000 times) | | 0.04 | 0.08 |
| Flex-cracking by Demattia tester (times)* | | 2630 | 2210 |

*According to ASTM-D-813-59 (crack growth).

As can be noted from the results shown in Table 9, the sample (E) obviously exhibits a superiority over the comparative sample (F) with regard to the fundamental physical properties such as the tensile strength, the tear resistance and the Akron abrasion.

We claim:

1. Process for producing a rubbery polymer having a branched structure, which comprises bringing continuously into a polymerization zone a mixture consisting of a conjugated diolefin having from 4 to 5 carbon atoms per molecule and selected from the group consisting of 1,3-butadiene, 2-methyl-1,3-butadiene and 1,3-pentadiene, a hydrocarbon diluent selected from the group consisting of a paraffinic, cycloparaffinic and aromatic hydrocarbon having from 5 to 12 carbon atoms per molecule and a $C_2$–$C_8$ alkyllithium catalyst and at a predetermined temperature of from about 90° to about 235°C. to initiate polymerization of said diolefin therein, and continuing the polymerization of said conjugated diolefin while maintaining the polymerization themperature within said specified range of from about 90° to about 235°C. with a continuous addition of said conjugated diolefin, said hydrocarbon diluent and said catalyst to form said rubbery polymer, the initiation and continuation of said polymerization being carried out under polymerization conditions in which $k_I$ is greater than $k_P$.

2. Process according to claim 1 wherein said hydrocarbon diluent is a member selected from the group consisting of pentane, hexane, isobutane, isooctane, n-dodecane, cyclopentane, cyclohexane, methylcyclohexane, benzene, toluene, xylene and ethylbenzene.

3. Process according to claim 1 wherein the catalyst is n-butyllithium.

4. Process according to claim 1, wherein said catalyst is selected from the group consisting of ethyllithium, propyllithium, n-butyllithium, amyllithium, hexyllithium and 2-ethylhexyllithium.

5. Process according to claim 1, whetein the conjugated diolefin is butadiene.

* * * * *

UNITED STATES PATENT AND TRADEMARK OFFICE
CERTIFICATE OF CORRECTION

PATENT NO. : 3,887,535
DATED : June 3, 1975
INVENTOR(S) : SABURO MINEKAWA et al

It is certified that error appears in the above-identified patent and that said Letters Patent are hereby corrected as shown below:

Column 3, line 27: insert a hyphen (-) in "abovementioned".

Column 5, line 43: replace "a" with -- as --.

Column 6, line 51 and last line: replace "(C)" with -- (D) --.

Column 11, Table 5: under "Item", last line, "60°C." should be placed directly under "25°C."

Column 13, line 43: replace "$Ml_{1+4}$" with -- $ML_{1+4}$ --.

Signed and Sealed this twenty-fourth Day of February 1976

[SEAL]

Attest:

RUTH C. MASON
Attesting Officer

C. MARSHALL DANN
Commissioner of Patents and Trademarks